United States Patent [19]

Schwarzensteiner

[11] Patent Number: 4,696,497
[45] Date of Patent: Sep. 29, 1987

[54] QUICK CONNECTOR

[76] Inventor: Hermann Schwarzensteiner, D-8447, Windberg, Fed. Rep. of Germany

[21] Appl. No.: 869,009

[22] Filed: May 30, 1986

[30] Foreign Application Priority Data

Jul. 16, 1985 [DE] Fed. Rep. of Germany ....... 3525402

[51] Int. Cl.⁴ .................................................. F16L 37/08
[52] U.S. Cl. ................................... 285/307; 285/319; 285/323; 285/330
[58] Field of Search ............... 285/319, 317, 323, 307, 285/330

[56] References Cited

U.S. PATENT DOCUMENTS

| | | | |
|---|---|---|---|
| 592,899 | 11/1897 | Wilson | 285/317 X |
| 2,869,099 | 1/1959 | Robinson | 285/319 X |
| 4,508,369 | 4/1985 | Mode | 285/323 X |
| 4,588,214 | 5/1986 | Guest | 285/307 X |

FOREIGN PATENT DOCUMENTS

| | | | |
|---|---|---|---|
| 845563 | 6/1970 | Canada | 285/319 |
| 86404 | 1/1959 | Denmark | 285/307 |
| 2627397 | 12/1977 | Fed. Rep. of Germany | 285/323 |
| 103241 | 1/1964 | Norway | 285/319 |
| 281086 | 9/1970 | U.S.S.R. | 285/319 |

*Primary Examiner*—Thomas F. Callaghan
*Attorney, Agent, or Firm*—Kane, Dalsimer, Kane Sullivan and Kurucz

[57] ABSTRACT

The invention proposes a quick connection which has utility in a wide field, for instance, for connecting fluid lines, electric cables, etc., and comprises an inserted tubular end portion, which is formed near its extreme end with concave recesses serving as detent means, and which is provided with a radially acting locking collar. The second tubular end portion comprises a socket, which contains an inserted locking ring, which has detent fingers, which releasably interlock with the concave recesses of the inserted tubular end portion and are provided on their back side with reversely foldable, thin webs which bear on the inside surface of the socket. Such quick coupling can be resiliently interlocked simply in that the tubular end portions are urged into each other, and can be unlocked only by an angular movement. The coupling is particularly adapted to be connected and disconnected by industrial robots in automated production sequences. The coupling transmits longitudinal forces and is radially locked. It can easily be disconnected and can be mounted quickly and is tight and prevents an ingress of dirt. The components of the coupling consisting of the tubular end portions and the locking ring preferably consist of plastics which are most suitable for the field in which the quick connector is to be used. Such plastics include, e.g., polyamides, PVC, polyethersulfone, polyetherketone or the like. The components may be made of rigid or flexible materials.

5 Claims, 4 Drawing Figures

QUICK CONNECTOR

This invention relates to a quick connector, such as a coupling for connecting fluid lines to each other or to connecting pipes or container ports or for connecting electric cables or machine members, which coupling snaps to its coupling position, wherein one tubular end portion or the like comprises a socket for slidably receiving another tubular end portion or the like.

Quick couplings for pipes etc. are known and are adapted to be locked in their coupling position by locking means, which are adapted to snap into the housing of the coupling. As is shown, e.g., in Published German application No. 31 43 015 the locking means cooperate with an annular projection provided on the pipeline. Other quick connectors comprise bores, which receive inserted pins or the like so that a spontaneous separation of the interfitting tubular end portions is prevented.

Such pipe connectors have disadvantages. For instance, in automated production plants, e.g., in the automobile industry, it is necessary for a rationalized production to use automatic devices for connecting tubes, hoses, cables etc. But the known quick connectors cannot be used for that purpose. Besides, the usual quick connectors are composed of different materials, in most cases of metal and plastic, which are used for the components of the coupling mechanism. Another disadvantage resides in that said quick connectors are complicated structures so that they are expensive.

That situation is to be remedied by the invention. The object underlying the invention is to provide for tubular members or the like a quick coupling which is structurally simple and can be made at low cost and can be automatically made, mounted and connected and disconnected.

This is accomplished in accordance with the invention in that the socket of the one tubular end portion contains an inserted locking ring, which comprises a plurality of axially acting detent elements, which extend into the gap between the inside surface of the socket and the inserted tubular end portion and are concentric to the latter and register and interlock with detent means of the inserted tubular end portion, and radially acting additional detent and centering means are provided above the detent means of the inserted tubular end portion and interlock with mating portions provided at the rim of the socket.

In a desirable embodiment, an annular groove of the socket of one tubular end portion contains an inserted locking ring, which is provided with a plurality of radially resilient detent fingers, which extend axially into the gap in the socket and are angled to have oblique portions extending toward the inserted tubular end portion, said inserted tubular end portion is formed with concave recesses for engagement by the detent fingers and on the level of the rim of the socket is provided with an eccentric annular locking collar, which has at least one indentation and interlocks with projections on the rim of the socket.

In a desirable embodiment the outer edges of the locking collar and of the rim of the socket are parallel to each other and extend between the indentations and projections coaxially or with an inclination of up to 45° to the peripheral surface of the tubular member.

In a desirable embodiment, the detent fingers are provided at least on their oblique portion on their back side with thin webs, which are movable in the peripheral direction. An annular groove for the sealing ring is desirably provided below the socket space.

The locking ring desirably consists of plastic.

At least one of the tubular end portions to be connected desirably consists of plastic.

The inserted tubular end portion is desirably formed integrally with the locking collar The locking ring and at least one of the tubular end portions to be connected desirably consist of different plastics. The advantage which is thus afforded resides in that the manufacture is simple and the coupling can be assembled quickly and in a simple manner in the production plant.

To couple the two tubular end portions they are slightly urged one into the other until the oblique ends of the angled detent fingers snap into the concave recesses of the tubular end portion so that the locking collar of that tubular end portion interlocks with the projections on the rim of the socket during the same operation. That coupling operation can be automated and can be carried out by industrial robots, which can also be used to disconnect the coupling in that one tubular end portion is rotated out of the locked position and is axially pulled out of the other tubular end portion. This will permit a high degree of rationalization in automatic production sequences, e.g., in the automobile industry, because there is no need for a manual intervention into the production sequence merely to connect or disconnect fluid lines or the like to each other or to containers. The resulting connection is tight and dimensionally stable and can transmit longitudinal forces and is locked in axial and radial directions.

The invention will now be explained in more detail with reference to an illustrative embodiment shown on the drawings.

Figure 1:
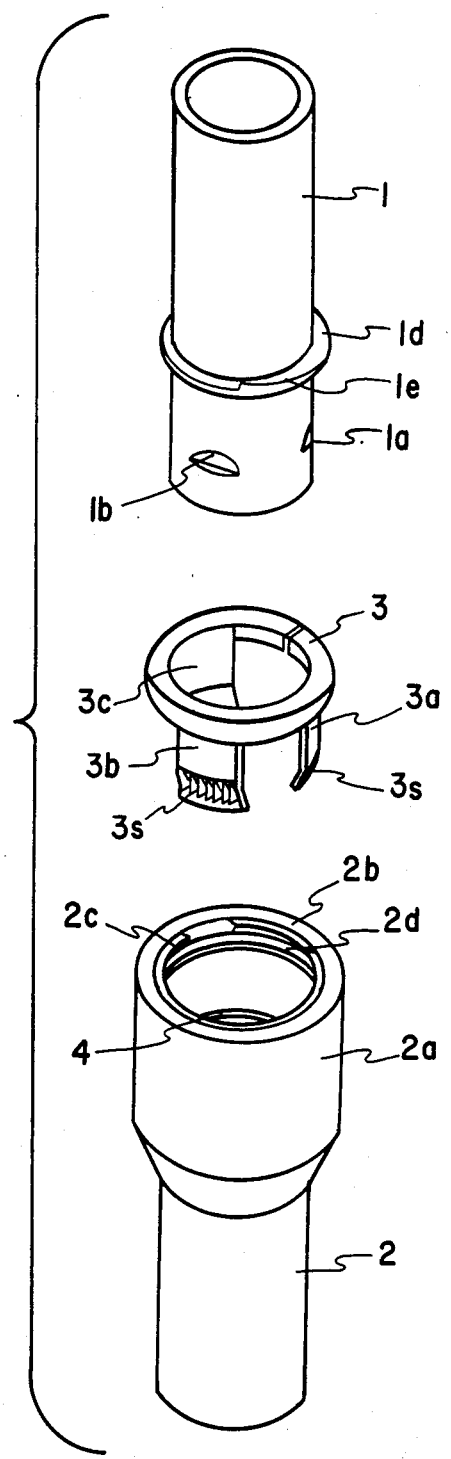
FIG. 1 is a perspective view showing the pipe joint.

FIG. 1 shows at its top a first tubular end portion, a so-called spigot 1, which is provided near its extreme end with a plurality of concave recesses 1a,1b (and the concealed recess 1c) as detent means and above said recesses is provided with an eccentric annular locking collar 1d, the rim of which has different inclinations from the indentation 1e to the point where said rim merges into said indentation 1e.

The tubular end portion 2 facing the spigot 1 is provided with a socket 2a. The rim of the socket 2a is formed with a projection 2b for insertion into the indentation 1e of the locking collar 1d provided on the spigot 1. That edge of the rim of the socket which faces the interior of the socket is inclined to be complementary to the edge of the locking collar 1d.

The locking ring 3 is inserted into the annular groove 2d of the socket 2a and comprises detent fingers 3a, 3b, 3c, which extend into the annular gap 2e (FIG. 2), which are defined by the spigot 1 and the inside surface of the socket 2a. The free end portions of the detent fingers 3a to 3c are slightly inwardly angled toward the spigot 1 so that they can snap into the concave recesses 1a, 1b, 1c of the spigot 1. The detent fingers 3a, 3b, 3c are provided on their rear side with thin webs.

A sealing ring 4 is disposed at the inner end of the socket 2a.

Figure 2:
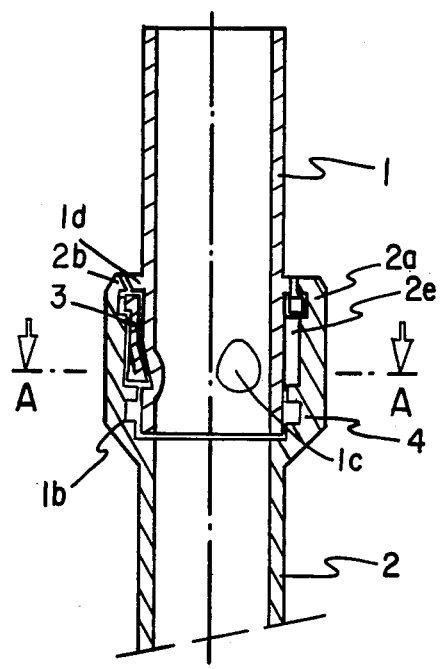
FIG. 2 is a longitudinal sectional view showing the coupling region
Figure 3:
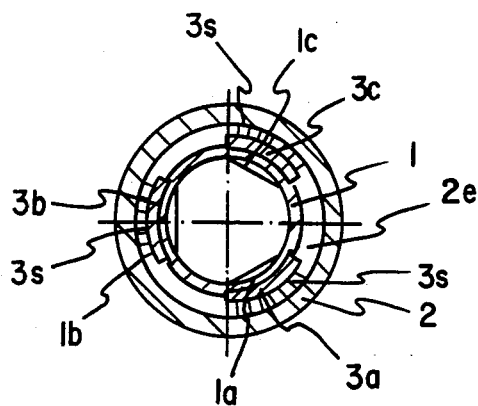
FIG. 3 is a sectional view taken on line A—A in FIG. 2.
Figure 4:
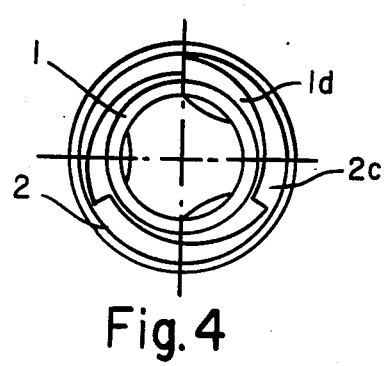
FIG. 4 is a top plan view of the pipe joint as shown in FIG. 2.

FIG. 2 shows the quick coupling in its coupling position, which has been obtained in that the spigot or inserted tubular end portion 1 has been urged into the socket 2a of the tubular end portion 2 and interlocks with the latter. As the spigot 1 is urged into the socket 2a, the detent fingers 3a, 3b, 3c are slightly urged outwardly-toward the inside surface of the socket so that the webs 3s bear on said inside surface. As soon as the concave recesses 1a, 1b, 1c register with the detent fingers 3a, 3b, 3c, the latter snap into said concave recesses so that the two tubular end portions 1 and 2 axially interlock. The pipe coupling is locked in a radial direction by means of the locking collar 1d, which is provided at the inserted tubular end portion 1 and interlocks with the rim 2b of the socket 2a in that the indentation 1e receives the projection 2c.

To disconnect the tubular members 1 and 2, one tubular end portion is rotated relative to the other, in the illustrated embodiment through an angle of about 60°. As one tubular end portion, e.g., the tubular end portion 1, is rotated relative to the other, the detent fingers 3a, 3b, 3c are cammed out of the concave recesses 1a, 1b, 1c of the other tubular end portion so that the thin webs 3s provided on the rear of the detent fingers 3a, 3b, 3c are reversely folded so that the ends of the detent fingers can slip out of the concave recesses. It is apparent that the connection cannot be eliminated by a pull in an axial direction. A spontaneous disconnection is also precluded. The rotation of the tubular end portion 1 eliminates also the interlock between the locking collar 1d and the rim 2b of the socket because the eccentric annular locking collar 1d having a rim which has different inclinations causes the tubular end portion 1 to slide up on the rim 2b of the socket during the rotation of the tubular end portion 1. As a result, the radial interlock of the indentation 1e of the locking collar and the projection 2c of the rim 2b of the socket is eliminated. The two tubular end portions can then be removed from each other.

The two tubular end portions 1 and 2 as well as the locking ring 3 are made of plastic. The locking ring 3 is preferably made of a polyamide whereas the two tubular end portions are made, e.g., of PVC. The plastics should be selected in consideration of the intended field of application of the plug-in connection and it is significant in this respect whether the tubular end portions should be rigid or flexible. It has been found that the suitable plastics include, inter alia, polyethersulfones and polyetherketones. It will be understood that the components can be made of materials other than plastic, although the latter is preferred.

If the tubular end portion 1 consists of plastic material, the concave recesses 1a, 1b, 1c and the locking collar 1d can be made by a molding process, just as the tubular end portion 2 with its socket 2a and the locking ring 3.

It will be understood that the application of the invention is not restricted to the field which has been explained with reference to the illustrative embodiment. The invention can be applied to advantage not only to pipe joints but also to connections between electric cables, machine elements etc. Besides, the joint is not restricted to the provision of detent fingers 3a, 3b, 3c spaced 120° apart and of concave recesses 1a, 1b, 1c in a corresponding number on the inserted tubular end portion 1 but said arrangement can be modified. The same applies to the design of the locking collar 1d with its indentation 2b and of the rim 2b of the socket 1a provided with the projection 2c.

I claim:

1. A quick connector for coupling one tubular member having a socket end portion to another tubular member and portion formed with a plurality of concave recesses, said socket end extending from an eccentric rim having at least one projection thereon, said other tubular member end portion extending to a locking collar, said collar having at least one indentation adapted to interlock with said eccentric rim projection, said tubular member end portions defining a gap therebetween when said socket end slidingly receives said other member end portion, a locking ring in said socket end portion, said locking ring comprising a plurality of radially resilient detent fingers extending axially into said gap wherein each of said fingers terminates in a radially inwardly, obliquely angled web movable in the direction of and circumferentially aligned with one of said recesses.

2. The quick connector in accordance with claim 1 wherein said collar has a plurality of identations and said rim has a plurality of projections, the outer edge of the locking collar and of the socket rim are parallel to each and extend between the identations and projections coaxially.

3. The quick connector in accordance with claim 1 wherein said collar has a plurality of identations and said rim has a plurality of projections, the outer edge of the locking collar and of the socket rim are parallel to each and extend between the indentations and projections at an inclination of up to 45 degrees.

4. The quick connector in accordance with claim 1 wherein said locking ring is formed of plastic.

5. The quick connector in accordance with claim 1 wherein the locking ring and at least one of the tubular end portions are formed of different plastics.

* * * * *